United States Patent [19]

O'Brien

[11] Patent Number: 4,467,621

[45] Date of Patent: Aug. 28, 1984

[54] FLUID/VACUUM CHAMBER TO REMOVE HEAT AND HEAT VAPOR FROM A REFRIGERANT FLUID

[76] Inventor: Paul R. O'Brien, Roosemelt Twrs. #3, 500 N. Roosemelt Blvd., Falls Church, Va. 22044

[21] Appl. No.: 421,320

[22] Filed: Sep. 22, 1982

[51] Int. Cl.³ .............................................. F25B 13/00
[52] U.S. Cl. ...................................... 62/324.1; 62/510
[58] Field of Search .......................... 62/218, 268-270, 62/510, 174, DIG. 17, 117, 196.2, 196.3, 196.4, 62/83, 93, 324.1

[56] References Cited

U.S. PATENT DOCUMENTS

| | | |
|---|---|---|
| 287,912 | 11/1883 | Davis . |
| 2,223,586 | 12/1940 | Thomas . |
| 2,277,647 | 3/1942 | Jones ................................. 62/510 X |
| 2,732,092 | 1/1956 | Lawrence . |
| 2,888,809 | 6/1959 | Rachfal .............................. 62/196.3 |
| 2,897,659 | 8/1959 | Wergner ............................ 62/510 X |
| 3,133,132 | 5/1964 | Loeb et al. . |
| 3,170,303 | 2/1965 | Rannenberg et al. . |
| 3,353,367 | 11/1967 | Garland et al. .................... 62/218 X |
| 3,500,653 | 3/1970 | Anderson .......................... 62/218 X |
| 3,568,466 | 3/1971 | Brandin et al. ........................ 62/510 |
| 3,589,140 | 6/1971 | Osborne ............................. 62/218 X |
| 3,621,666 | 11/1971 | Mokadan .......................... 62/498 X |
| 3,735,562 | 5/1973 | Jousseau, Jr. et al. . |
| 3,751,879 | 8/1973 | Allington . |
| 3,808,835 | 5/1974 | Weatherston ........................ 62/510 |
| 3,827,250 | 8/1974 | Kerschbaumer et al. .......... 62/196.2 |
| 3,877,245 | 4/1975 | Edwards ............................. 62/93 X |

Primary Examiner—Lloyd L. King

[57] ABSTRACT

A fluid/vacuum chamber (FVC) is disclosed comprising a rigid porous membrane element wherein a vacuum is applied to one side of the porous element and a fluid is passed along the other side of the porous element to remove the heat of vaporization via the pressure differential. This chamber is useful as to reduce energy consumption in a desalination unit, a heat pump, an icemaking system and refrigeration systems. The porous material may be constructed of sintered brass, sintered stainless steel, polymeric plastic, a paper filter element, etc. in order to provide porous openings, of about 5 to about 100 microns. Also disclosed is the use of a fluid/vacuum chamber (FVC) in a heating cycle or cooling cycle. A compressor or vacuum pump normally provides the vacuum suction for the fluid/vacuum chamber (FVC).

22 Claims, 20 Drawing Figures

FIG. 1
HEATING CYCLE

FIG. 2
COOLING CYCLE

FLUID/VACUUM CHAMBER TO REMOVE HEAT AND HEAT VAPOR FROM A REFRIGERANT FLUID

BACKGROUND OF THE INVENTION

The use of vacuum to remove heat and heat vapors from a working fluid has been found to reduce the Brake-Horse Power (BHP) requirements on a refrigerant compressor. This consequently will result in a saving of power consumption, i.e. a lessening of electrical energy expenditure. As both domestic and commercial refrigeration systems operate upon the same basic principle of engineering this savings will be respectively realized in the use of both systems. Saving can also be realized in ice-making systems and water desalination systems, heat pumps, air conditioning and similar systems which utilize principles of refrigeration.

Nearly all refrigeration systems operate on the principle of latent heat of vaporization for the refrigerant working fluid. And this fact also holds true for heat pumps. It is advantageous to efficiently and effectively remove large amounts of heat from refrigerant working fluids as they are cycled between condensers and evaporators. In this manner the fluids, i.e., fluorocarbons, $NH_3$, $H_2O$, etc. can be made to vaporize with less expenditure of electrical energy by the compressors. The use of the instant fluid (gas and liquid)/vacuum chamber could feasibly amount to a 40 to 75% savings in energy expenditure depending of course on tonnage or design.

FIELD OF THE INVENTION

In desalination systems using freezing pretreatment the cost of energy consumption is a large expense. By maintaining a fluid-vacuum chamber (FVC) within a small or large desalination system energy costs can greatly be minimized. For example, when the freezing cycle pretreatment is utilized, salt water is normally reduced to a temperature of about 28° F., at which point the salt water begins to freeze. The salt water is pumped to a chiller/evaporator/freezer under pressure of about 200 lbs per square inch. The salt water is reduced to about 28° F. and then enters a centrifuge for separation. An expansion valve is usually positioned at the entrance of the centrifuge to not only reduce the pressure of the salt water but to also break up the water into ice droplets. The reduction in pressure causes a corresponding drop in temperature assisting in separation of the salt from the water and thereby the production of a more efficient potable water stream. The energy requirements in such a system depends of course upon the size of the potable water output. In a typical desalination unit the refrigeration costs alone is approximately 0.39 cents per 1000 gallons of potable water in comparison with the total energy cost of about 0.67 cents per 1000 gallons of potable water or about 42% less costly. The incorporation of a fluid vacuum chamber (FVC) between the chiller/evaporator/freezer and the centrifuge will act to greatly mitigate this cost of energy consumption necessary for the production of potable water. Although not wishing to be held to any specific rationale for the savings of energy in such an environment, it is understood that the egression of vapors, and the heat they contain, from the mixed vapor and liquid stream will result in less energy expended in the freezing of the salt water in the pretreatment step.

The incorporation of the instant fluid/vacuum chamber (FVC) can be made to new or retrofitted refrigeration equipment for ice-making capabilities, refrigeration or air conditioning system. These systems can range in size from 25 lbs to 500,000 lbs per hour of ice-making capability or up to 5,000 tons of refrigeration. Of course, in the larger sized systems the capital cost of the fluid/vacuum chambers (FVC) is more readily offset by operating cost efficiencies. The fluid/vacuum chamber (FVC) can most readily be incorporated between the evaporator and the freezing unit in order to handle the heat extraction from the refrigerant more efficiently. It is also contemplated that more than one fluid/vacuum chamber (FVC) can be utilized between the evaporator and the freezing units. The heat condensate removed from the fluid/vacuum chamber (FVC) can be directed to the heat exchange condenser to mitigate operating costs. This reduces the size and costs of evaporators, condensers and compressors. It is conceivable that the proper installation of one or more fluid/vacuum chambers (FVC) in an air-cooled refrigeration unit having ice-making capabilities will reduce energy requirements by from about 20 to about 70 percent vis-a-vis the energy necessary to maintain the refrigerant compressor without the (FVC). It is also contemplated that the savings may be analogous in a water-cooled refrigerant system having ice-making capabilities but not necessarily equivalent to or as high as the air-cooled refrigeration entity. As much as a 35 to 70% saving can be obtained on equipment size (i.e., evaporators, heat exchangers, compressors, etc.) which will result in a 135 to 200% increase in efficiency for a comparable quantum of heating and cooling.

The instant invention also can be incorporated to units operable to provide refrigeration. In such units chilled water is produced in order to provide conditioning for the environmental air treated. This invention can be incorporated or retrofitted to systems ranging from 500 to 5000 ton capacity. It is also contemplated that a multiple number of these 25 to 5000 ton units can be employed to make up a 50,000 ton unit to produce chilled water in a much more energy viable manner. For example, the refrigeration circuit can or should produce a constant supply of water at 40° F. even though temperatures higher and lower can be produced. The purpose of the instant fluid vacuum chamber (FVC) is to remove heat which is built up in a closed water circuit after passage through a pressure reducing and/or expansion valve or even a capillary unit. This removal of heat will permit the chilled water to remain at a relatively constant temperature as it passes through a multiple number of evaporators and thereby result in a reduction of the energy requirement of a compressor. This system is also contemplated for use in a heat pump environment as exemplified in FIGS. 1 and 2 of the instant drawings, both heating and cooling cycles. With always increasing electrical energy costs, the necessity for improvements in the efficiency of chilled water systems for air conditioning in home or industrial or heat pump use is advantageous to all. The (FVC) capability will enhance heating capabilities down to 10° F. rather than (35° to 40° F.) as heat pump systems are presently designed. The incorporation of the instant fluid/vacuum chamber (FVC) in a desalination unit, an ice making unit or a chilled water air conditioning unit will thereby help to lessen electrical energy costs. Foreseeably up to 70% of electrical energy costs can be saved by the increased efficiency obtained by the simple incorporation of a fluid/vacuum chamber (FVC) or a multiple of these entities to a new unit or in the alternative by retrofitting older and larger refrigeration, desalination or ice making unit.

PRIOR ART

Candor compels a recognition of known prior art. A very early patent to J. T. Davis, U.S. Pat. No. 287,912 (1883) discusses the removal of sensible and latent heat of water to a vacuum container whereby the remaining water temperature is reduced and ice is formed thereby. A dehumidifying system is discussed in Thomas, U.S. Pat. No. 2,223,586 (1940) wherein a gas which is to be dehumidified is circulated over a humidity exchanger containing a hygroscopic material such as parchment paper which is relatively permeable to the water vapor and not to the other components of the gas stream. The hygroscopic separating wall is held at about atmospheric pressure or substantially the same pressure as the air or gas being dehumidified and flowing through the dehumidification jacket. A teaching is made that too great of a difference in the pressure of the opposite sides of the separating walls will prevent a viable dehumidification system. The variances in pressure are prevented by a liquid trap which controls the leakage of inner gas to the atmosphere.

A closure device is discussed in Lawrence, U.S. Pat. No. 2,732,092 (1956) wherein a polymeric membrane is situated in the top of a container which is selective only to the passage of hydrogen through the membrane. In this manner hydrogen build-up within the container is prevented and the hydrogen gas being egressed therefrom is diffused through multiple venting holes in the outer lid. This of course prevents any danger of explosion from built-up hydrogen.

A thin membrane which is selective for the passage of fresh water from a saline solution is described in Loeb et al, U.S. Pat. No. 3,133,132 (1964). The instant membrane is activated so that a saline water solution can be held under pressure during the desalination process in order to prevent a high accumulation of salt concentration near the porous medium. In 1965 two patents were issued to Rannenberg et al, U.S. Pat. Nos. 3,197,973 and 3,170,303 which relate to the migration of a liquid through a porous membrane wherein the liquid is designed to freeze adjacent to or within the porous plate. When a solid plug of ice is formed in the passage sublimation occurs and the water begins to flow through the passage to space. A vacuum is provided below the refrigerant triple point surrounding the porous material as depicted in FIG. 1 of the '973 patent. The porous material may be sintered metal, stainless steel or the like which defines the refrigerant chamber. Also, non-metal porous materials are also contemplated within the scope of Rannenberg et al's invention. These systems are, however, directed to a sublimation technique and are in fact nearly directly opposite to the intention of the instant invention. A unique particular membrane for gas/liquid separation is described in Mousseau et al, U.S. Pat. No. 3,735,562 (1973) which comprises an unsintered polytetrafluorethylene. It was found therein that this type of brochure functions as a non-selective porous barrier wherein the membrane was able to separate out gas at a rate of sufficient speed to permit a viable separation. Other membranes such as polyethylene and non-porous teflon were tried but did not function at an acceptable rate of speed. In Allington, U.S. Pat. No. 3,751,879 (1973), a gas removing apparatus is directed to the removal of gases from solvents using as a membrane or film a fluorosilicone compound, the opposite surface of the membranes provided with a coating of a gas soluble substance for increasing the permeability of the membrane and thereby enhancing the permeation of the gas through the membrane. A vacuum is pulled exterior to the membrane in order to aid the migration of the fluid. An annulus of a porous rigid support material which may be made of sintered brass or sintered teflon is concentrically disposed about the elongated permeable membrane for removal of the gas.

It is believed that none of the above references seek to remove heat and the heat of vaporization from a refrigerant fluid through a porous solid or semi-solid membrane in the selective manner of this invention to provide a lower temperature refrigerant fluid for continuous use within a circuitous refrigeration or heating systems.

DETAILED DESCRIPTION OF THE DRAWINGS

Figure 1:
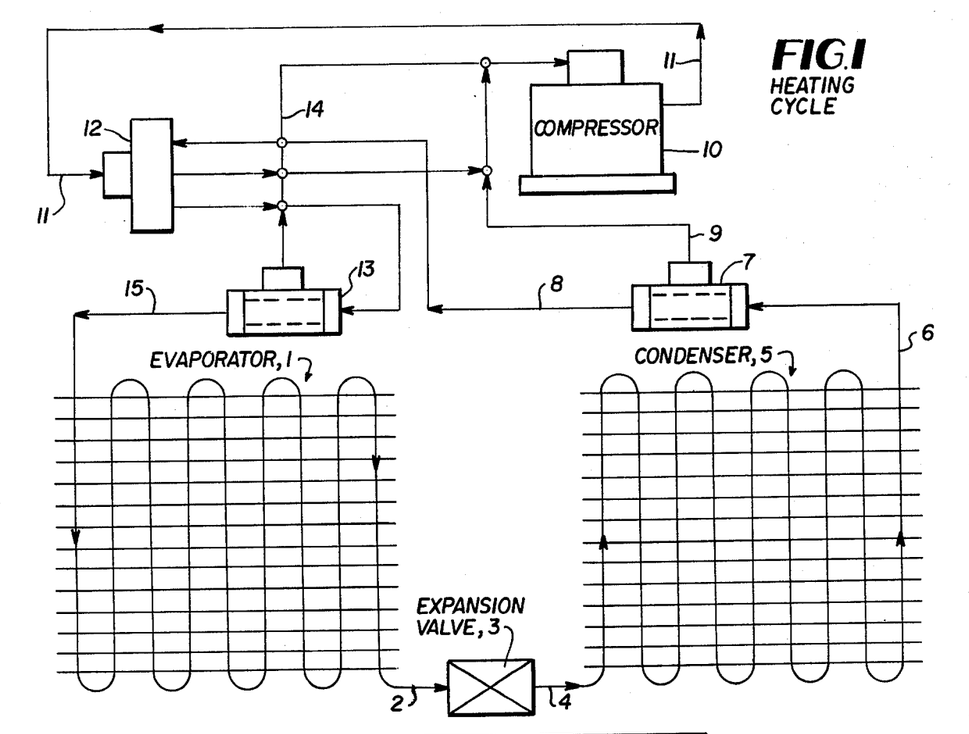
FIG. 1 shows the use of a fluid/vacuum chamber in a heat pump with the direction of fluid flow being in the heating cycle.

FIG. 1 shows the use of multiple fluid/vacuum chambers (FVC) in a heat pump with the direction of fluid flow being in the heating cycle. While one of the FVC's may be inactive it is also contemplated that both may be active and utilized in this environment. It is important to note that the expansion valve can be replaced with nearly equivalent results with a capillary tube conducting the working fluid to then expand the liquid to a vaporliquid phase.

After a quantity of the heat of vaporization has been removed via a FVC (hereinafter exemplified in FIGS. 6 through 16), a fluid in closed cycle will flow to evaporator 1 which permits the evaporator to operate at a lower ambient temperature while the fluid undergoes heating in the heating cycle. The fluid egresses from the evaporator via conduit 2 and is charged into expansion valve 3, which may also be a capillary tube. The expansion valve operates to expand (via a pressure differential) the liquid phase into a vapor-liquid phase. Passage from the expansion valve or capillary tube 3 is made via conduit 4 to condenser 5. In the condenser in the heating cycle outside air is brought in in order to heat the vapor-liquid phase. If necessary, an auxilliary heater can be provided where ambient temperatures fall below 10° F. or so, the only requirement being that the outside air is warmer than the air passing through the condenser so as to act as a warming agent. The vapor-phase once heated passes from the condenser 5 through conduit 6 and into a (FVC) 7, which may be either a shell and tube type or a plate type, both of which are further defined in regard to subsequent drawings. It is also optional to omit this FVC in light of the presence of a FVC between the four-way valve and the evaporator. The phase exiting the FVC 7, if in use, will be made by means of conduit 8, some of the latent heat of vaporization having been removed by the novel functioning FVC of this invention. In essence, the heat is removed by use of a vessel having a porous exterior with a vacuum being pulled on the opposite side of the fluid flow. The fluid senses a pressure differential between the pressurized system of conduit 6 entering FVC 7 and the vacuum pulled on the FVC via conduit 9. Heated vapor will automatically migrate through the hereinafter defined porous tubes as a vapor which is pulled off or removed by the pull of the vacuum. This removal of heat via the FVC 7 causes the stream exiting the same in conduit 8 to be cooler in comparison to the stream entering FVC 7. The vacuum upon the condenser is provided by means of vacuum conduit 9 and compressor 10. When water and/or brine are used as the working fluids the heat generated by the compressor can be vented directly to the atmosphere which will result in reducing the size and cost of the heat exchange of the heating system. Fluid transversing through the compressor eventually returns to the closed cycle system via conduit 11 and four-way valve 12. The four-way valve is situtated between the compressor 10 and the second FVC 13 in order that the heating cycle may be reversed to a cooling cycle by a mere switch of the valve. A suction conduit 14 is provided for FVC 13. The fluid exiting the FVC 13 does so via conduit 15 and is passed to evaporator 1 to complete its cycle of the fluid flow. Air or other gaseous material is heated via indirect heat exchange and forced by means of a blower fan into conduits not pictured for elevating the temperature in a building or structure. The use of one or more FVC's 7 and/or 13 will reduce the heat of vaporization of the respective working fluid stream treated and thereby mitigate the energy cost of this process by reducing the sizes and costs of evaporators, condensers and compressors.

Figure 2:
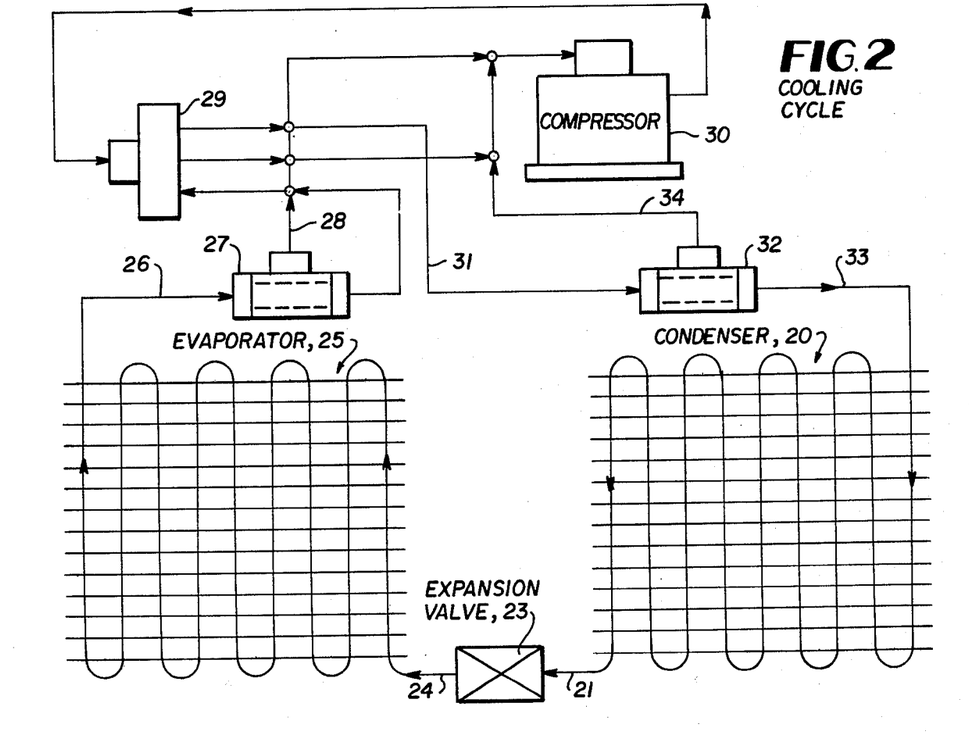
FIG. 2 shows the use of a fluid/vacuum chamber in a heat pump with the direction of fluid flow being in the cooling cycle.

The above system is shown in FIG. 2 which is operating in the cooling cycle. The condenser 20 in the cooling cycle acts to remove the heat at a relatively high pressure. Fluid, usually mostly liquid, exists from condenser 20 in conduit 21 and is passed to expansion valve 23, which may also be a capillary tube as described in the alternative embodiment of FIG. 1 above, i.e., the heating cycle. This expansion valve operates at a pressure differential so as to expand the liquid phase into a vapor-liquid phase which egresses from the expansion valve 23 via conduit 24. This mixed fluid phase then enters evaporator 25 wherein cooling occurs by means of the evaporation of part of the fluid. The vapor-liquid phase is then passed through conduit 26 to a FVC 27, the same possessing a vacuum suction line 28 via a four-way valve 29 and compressor 30. In this passage through FVC 27 the mixed phase fluid losses its heat of vaporization as demonstrated in below FIGS. 6 through 16. As is true with the heating cycle, merely one of the FVC's needs to be utilized, that is, either or both FVC 27 or FVC 32 may be utilized in the cooling cycle. In summary, compressor 30 acts to pull a vacuum on suction line 28, thereby causing removal of the heat of evaporization. The four-way valve 29 is positioned such that the operation of the system may be modified between a heating cycle (FIG. 1) and a cooling cycle (FIG. 2) by the mere flipping of a convenient in-home or in-plant switch. The fluid passing through the four-way valve will then enter the second FVC 32 via conduit 31 for passage to condenser 20 via conduit 33. Within the FVC 32 a vacuum is pulled via vacuum suction line 34. By this passage some of the heat of the vapor phase is removed by FVC 32.

Figure 3:
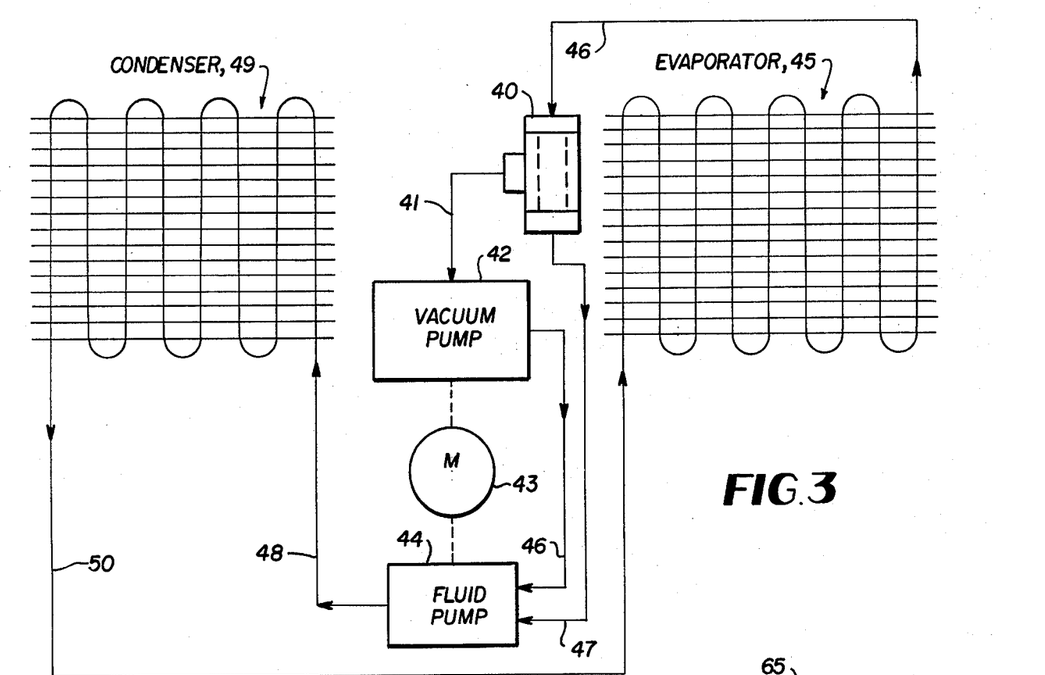
FIG. 3 shows a heating cycle wherein a vacuum pump and fluid pump operate to eliminate the need for a compressor.

An alternative heating cycle is shown in FIG. 3 wherein a vacuum pump dual shaft motor and fluid pump are employed in deference to the compressor unit of FIG. 1. In this flow scheme a FVC 40 is shown on the suction side of a pumping circuit provided by vacuum pump 42 and vacuum suction line 41. Vacuum pump 42 may be equipped with a pilot valve to discharge vapors to the atmosphere where necessary. A motor 43 is provided with a dual shaft in order to operate both the vacuum pump 42 and the fluid pump 44 concomitantly. Fluid having a mixed gas-liquid phase exits evaporator 45 by means of conduit 46 and then traverses FVC 40 wherein the latent heat of evaporization is removed via a plate or a shell and tube type FVC as shown in FIGS. 6 through 16. The waste vapors containing the extracted heat are passed via conduit 40 to vacuum pump 42 for disposal or passage through the fluid pump via conduit 46. The fluid exits FVC 40 through conduit 47 and passes through the fluid pump 44 into conduit 48, wherein the fluid is passed to condenser 49. After passage through condenser 49, the fluid exits via conduit 50 for passage back to the evaporator and the completion of the heating cycle. This type of system may be utilized without a compressor via the vacuum pump and fluid pump where the economy of operation and capital cost is a primary consideration, i.e. non-commercial units of smaller operation.

Figure 4:
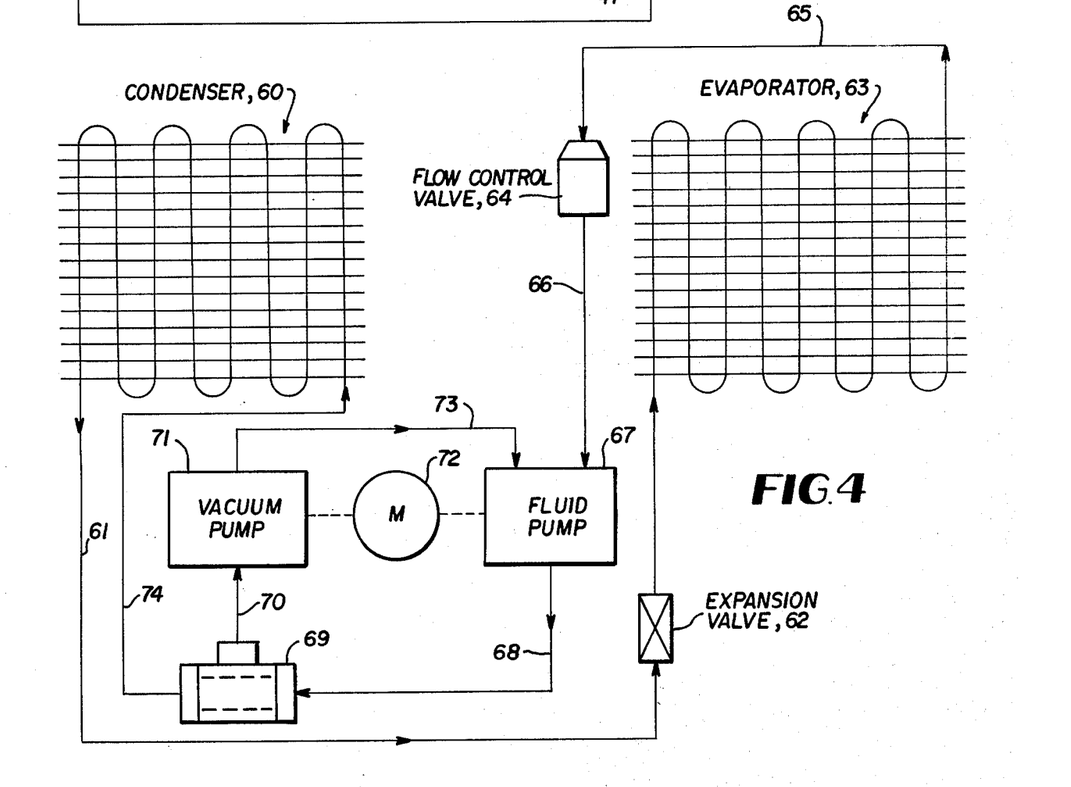
FIG. 4 shows a cooling cycle wherein a vacuum pump and fluid pump operate to eliminate the need for a compressor.

FIG. 4 illustrates a similar refrigeration circuit except that the FVC 69 is on the high pressure side of the working refrigerant fluid circuit, which acts to draw off the heat of the vapors generated by an increase of pressure/temperature on the working refrigerant fluid. A fluid is cooled in condenser 60 and is emitted therefrom mostly in the liquid phase in conduit 61. This stream is passed to expansion valve 62 wherein a pressure differential creates a vapor-liquid fluid phase, which is cooled via expansion in evaporator 63. A flow control valve 64 regulates the passage of vapor-liquid phase egressing from the evaporator in conduit 65. The vapor-liquid fluid is passed through the control valve 64 and exits therefrom via conduit 66 to fluid pump 67 whereby it is pumped via conduit 68 to FVC 69. At this point the heat of the vaporization is removed by means of vacuum suction line 70 in FVC 69 attached to vacuum pump 71, which likewise is attached to a dual shaft motor 72. The latter also can operate fluid pump 67. A vapor stream may be passed from vacuum pump 71 to the fluid pump 67 by means of conduit 73. The fluid exiting FVC 69 in conduit 74 possesses a lower temperature than that of the fluid in conduit 68, the former of which is passed in condenser 60 for cooling of the fluid to complete the refrigerant fluid cycle. The employment of FVC 69 results in a cooling of the stream in conduit 74 and therefore less energy needs to be expended in the condenser 60 in order to adequately cool the fluid.

Figure 5:
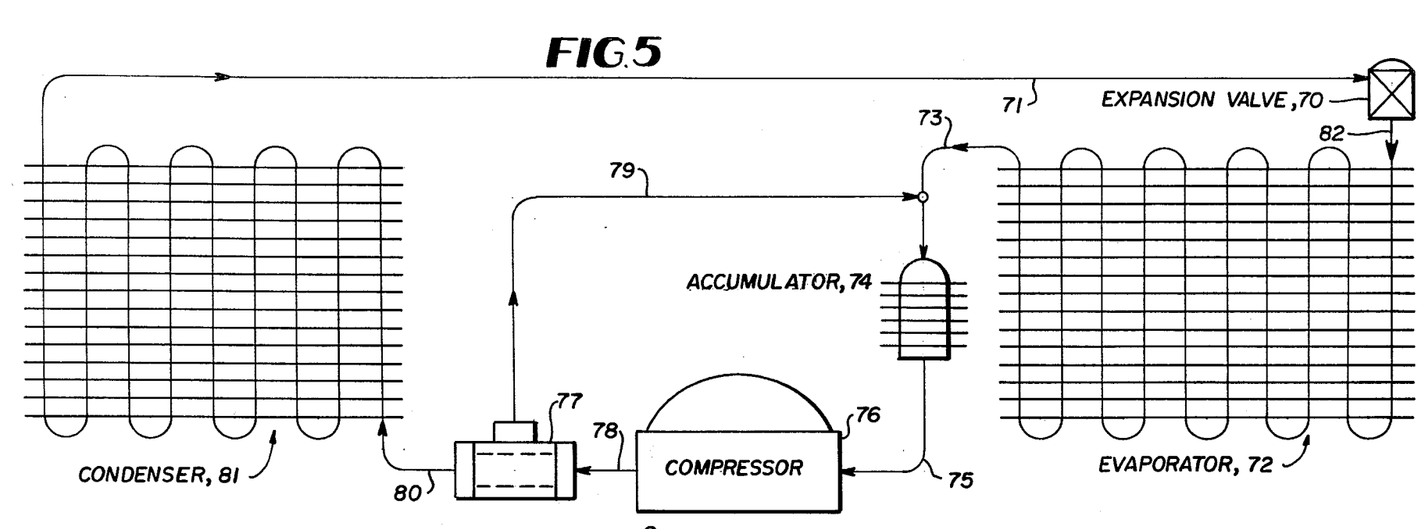
FIG. 5 shows the use of an accumulator, refrigerant compressor and a fluid/vacuum chamber to extract heat from a working refrigerant fluid.

FIG. 5 shows the flow scheme incorporating therein an accumulator which, in the cooling cycle, is a means for further cooling the fluid refrigerant. An expansion valve 70 acts upon a fluid, mostly present in the liquid phase via pressure differential, and discharges the same into evaporator 72 via conduit 82 wherein the vapor and liquid stream undergo evaporation and are thereby cooled. This stream exits evaporator 72 in conduit 73 to passage into the aforementioned discussed accumulator 74. The stream egressing from the latter via conduit 75 and is passed through compressor 76, exiting therefrom in conduit 78 to FVC 77. A vacuum is pulled via a vacuum suction line 79 and some of the heat of vaporization of the fluid stream contained within conduit 78 is withdrawn from the refrigerant. The remaining fluid is then passed from conduit 80 to condensor 81.

DESCRIPTION OF THE FLUID VACUUM CHAMBER (FVC)

The fluid vacuum chambers (FVC) are depicted in their operating environments in FIGS. 1 through 5. They are explicitedly detailed per se in the description of the following drawings.

Figure 6:
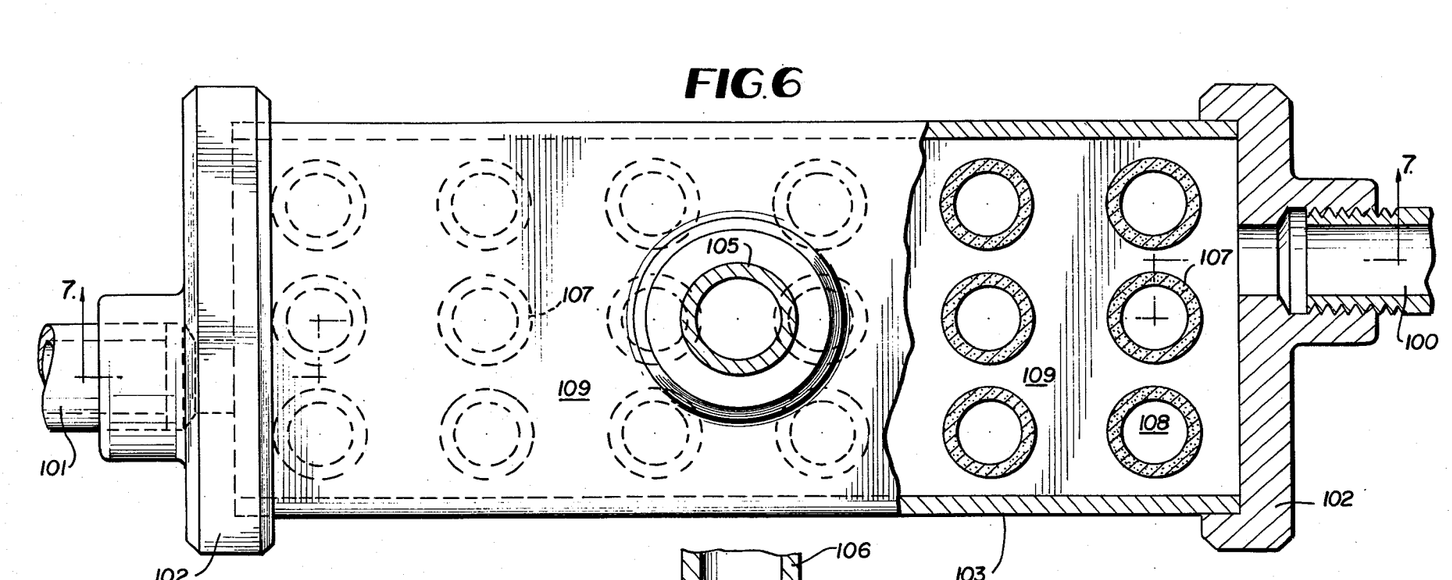
FIG. 6 shows a plate type fluid/vacuum chamber with a rectangular housing, which could also be square or round, with multiple fluid/vacuum conduits contained within.
Figure 7:
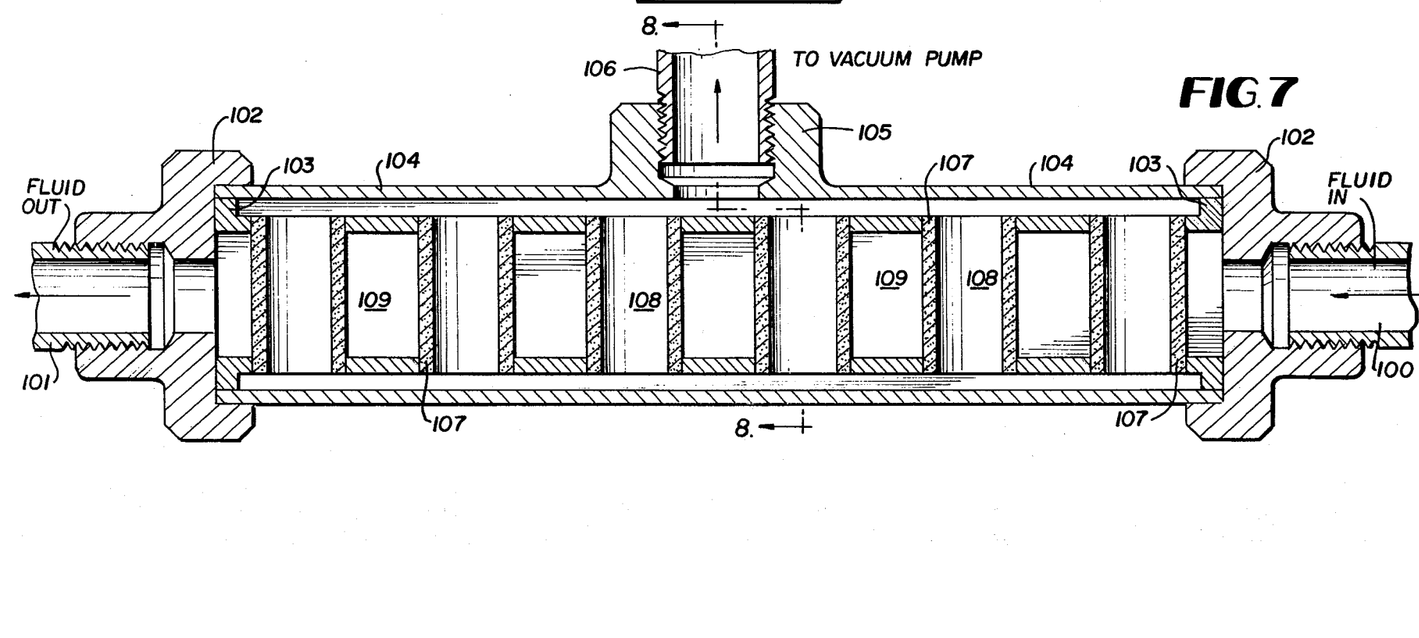
FIG. 7 is taken along lines 7—7 of the plate type fluid/vacuum chamber of FIG. 6.
Figure 8:
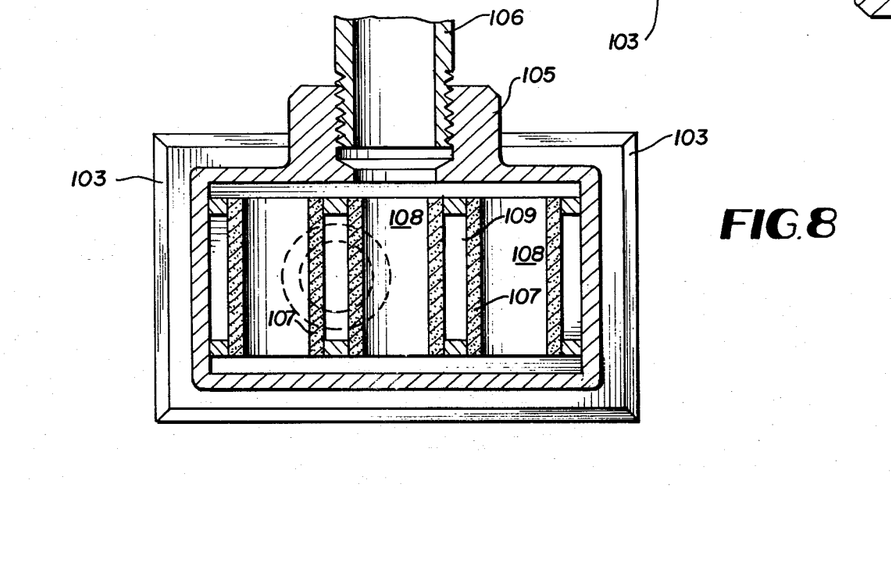
FIG. 8 is a side view taken along lines 8—8 of the plate type fluid/vacuum chamber of FIG. 7.
Figure 9:
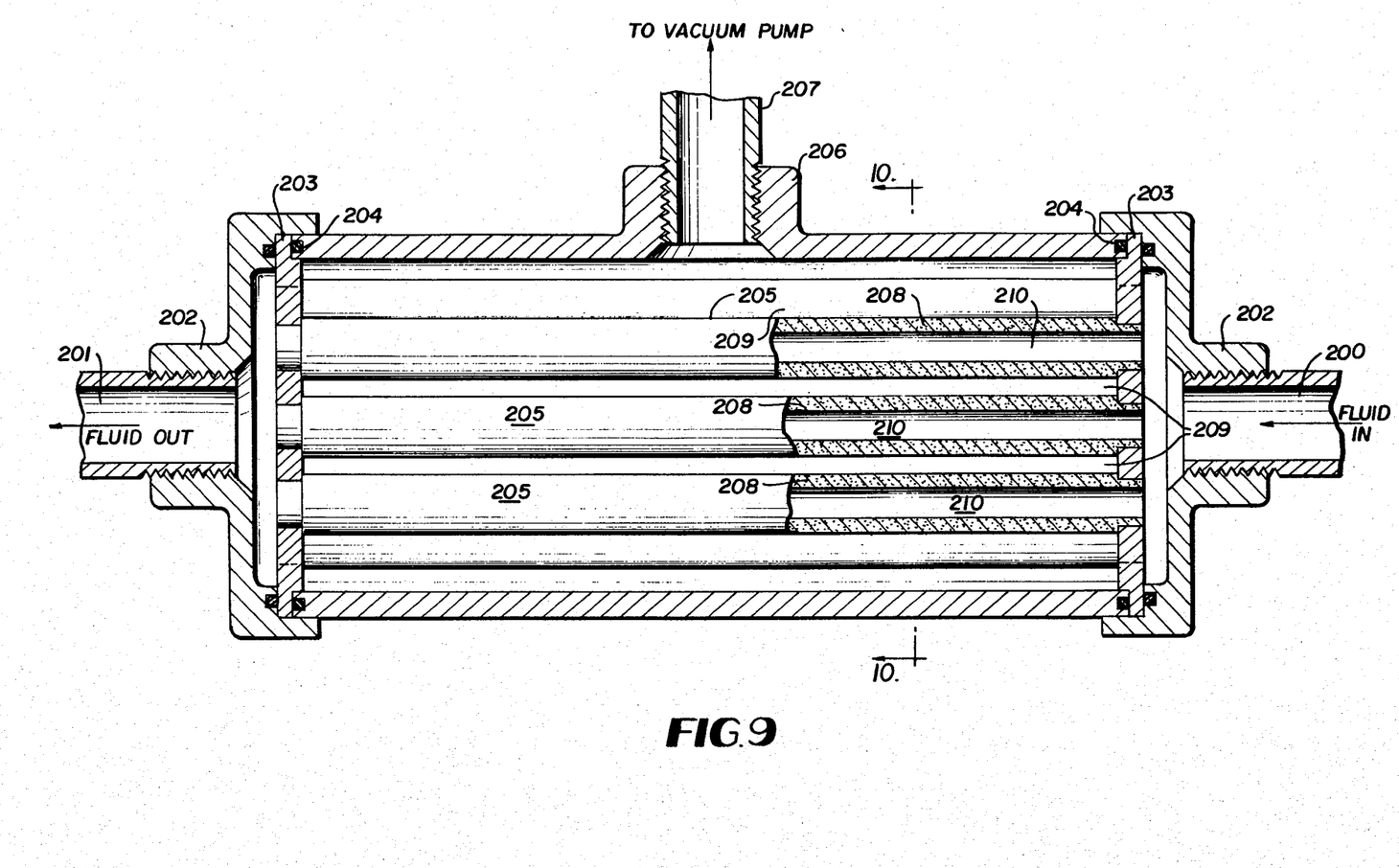
FIG. 9 is a shell and tube fluid/vacuum chamber with multiple porous ridged membrane filters.

FIGS. 6, 7 and 8 highlight a FVC which is normally referred to as a plate type unit. In essence, a refrigerant fluid such as water, brine and water, ammonium (NH$_3$) or other conventional refrigerant enters the (FVC) at inlet 100 and exits the same at outlet 101. The heat of the refrigerant fluid will be removed by means of its flow around various porous membranes where heat and heat vapor is selectedly extracted from the fluid traversing the column. The vacuum pulled upon the fluid via the porous membrane will draw off heat of vaporization of the fluid in the direction of the vacuum the captured hot vapor can then be directed for recovery in the refrigeration circuit to reduce the expenditure of energy elsewhere.

More specifically as to FIG. 7, a header 102 is provided for coupling the FVC to the fluid inlet 100 and outlet 101. In addition to this header a fluid retaining housing 103 and a vacuum housing 104 are also provided. A vacuum housing boss 105 is an interconnection with the vacuum housing 104, and housing vacuum line 106. The arrow of direction of the fluid pulling a vacuum on FVC (formed by conduit 106) is in the direction of a vacuum pump or compressor. Vacuum is drawn upon each individual porous membrane via a manifold in order to provide a pressure differential wherein the heat of the vapor may be withdrawn from the fluid entering inlet conduit 100 and leaving at a cooler temperature in conduit 101. The instant porous membrane sections are in intercommunication with the vacuum via a manifold as more clearly shown in FIG. 8. There can be a multitude of rigid porous membrane units within a plate type FVC. The outer wall of the rigid porous membrane 107 are made of many different contemplated materials including but not limited to sintered powdered bronze, sintered powdered copper, sintered or relatively porous stainless steel, ceramic materials with openings of 5 to 100 microns in size, paper filter materials with like openings, ultrafiltration membrane units possessing even smaller micron sizes, organic polymeric material which has been treated in order that the porous openings are 5 to 100 microns in size. The semi-rigid membrane elements are contemplated to possess varying dimensions depending upon the capacity of the unit to be served and the dimensional capabilities of the plate tube. The cylindrical wall thickness will also depend upon the design requirements, the type of refrigerant fluid to be utilized and the severity of the vacuum to be drawn upon to the membrane. However, a thickness of 5 to 100 microns in size for the porous opening is usually contemplated. It is also contemplated that a silica or silica gel be admixed with the material forming the porous membranes.

The latent heat of the fluid, i.e., heat of vaporization, will be removed as a result of the pressure differential vis-a-vis the interior of the porous membrane unit 108 and the exterior portion 109 which contains the refrigerant fluid that traverses from inlet 100 to outlet 101. During this contact, the vapor phase and some of the liquid phase of the two phase fluid senses the pressure differential and accordingly migrates through the sintered metal having small porous openings. In this manner the heat expands into the area having the lowest pressure. This results in the removal of the heat of vaporization of the fluid material and thereby acts to cool the fluid. FIG. 6 further shows the large space 109 containing the refrigerant fluids which passes over the sintered metal or porous material 107. FIG. 8 shows the manifold system connecting each individual porous membrane system to a central vacuum for removal of the heat of vaporization from the transversing fluid. It is contemplated that one or more manifold may be connected to one or more membrane, each plate type unit not necessarily having an exclusive vacuum suction line to the vacuum pump or compressor.

Figure 10:
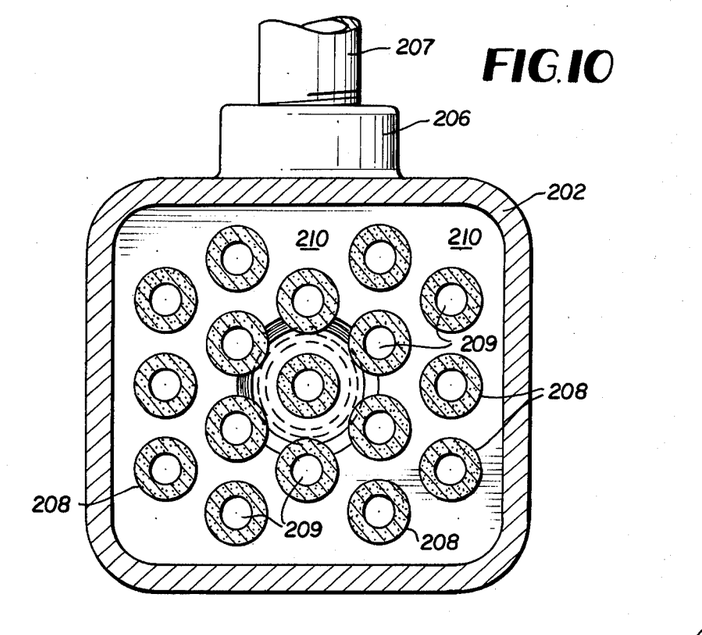
FIG. 10 is a cross-sectional view of the shell and table fluid/vacuum chamber of FIG. 9 taken along lines 10—10.
Figure 11:
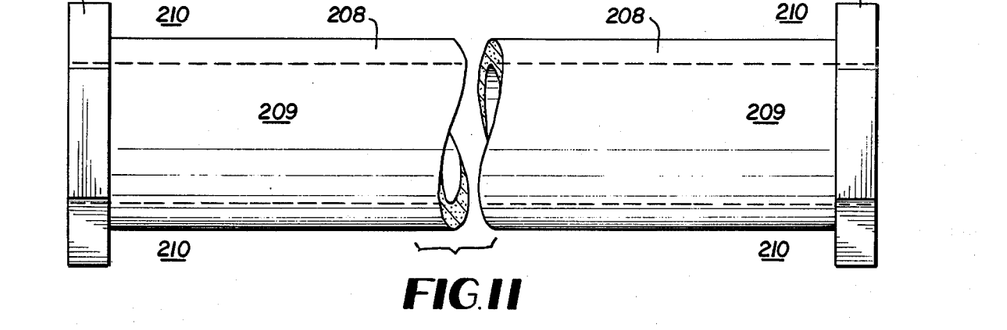
FIG. 11 shows a side view of a singular fluid/vacuum chamber membrane that is rigid or semi-rigid.
Figure 12:
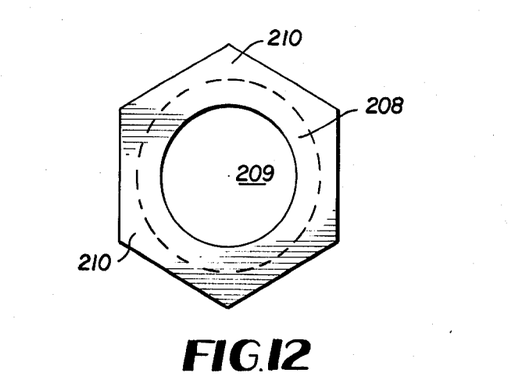
FIG. 12 shows a cross-sectional view of the membrane of FIG. 11 having a hexagonal head.
Figure 13:
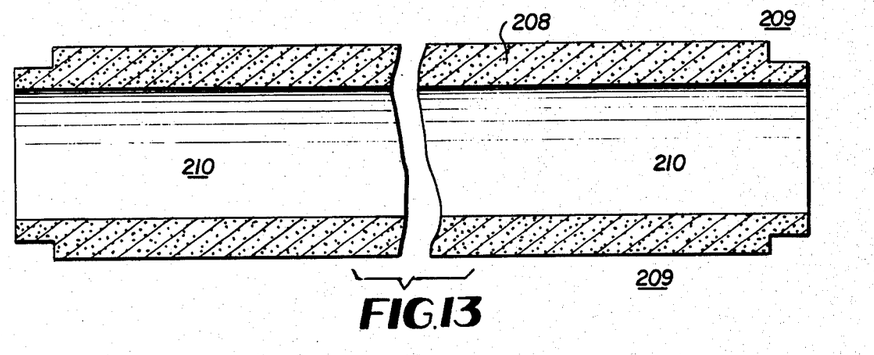
FIG. 13 shows a different head design on a singular fluid/vacuum membrane that is rigid or semi-rigid.
Figure 14:
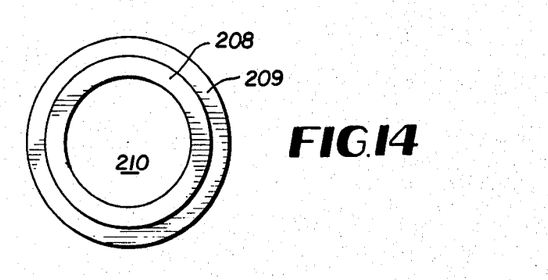
FIG. 14 shows a cross-sectional view of the membrane of FIG. 13.

A shell and tube type FVC is depicted in FIGS. 9 through 14. This system comprises an elongated tube of approximately 36 to 48" in length (although the size is not critical to the operation of this invention) with many horizontal elongated porous membrane units running transversely or parallel to the axis of the tube. As in FIGS. 6, 7, and 8 a fluid inlet 200 and a fluid outlet 201 is provided for the ingression flow of a warmer fluid through the inlet and egression of a cooler fluid through the outlet, as a result of the removal of the heat of evaporization contained within the fluid. A fluid vacuum header 202 interconnects an end plate header 203 wherein O-ring 204 acts to prevent fluid leakage. The rigid porous membrane elements 205 are disposed parallel to the transverse axis of the tube. A vacuum housing 206 and vacuum conduit 207 connect the FVC to a vacuum pump, not depicted in the drawing of FIG. 9. Refrigerant fluid will enter the FVC and flow through the membrane elements 205 which are made of like material as those of FIGS. 6 through 8. Thus, the heat or the heat of vaporization is selectively extracted from the fluid refrigerant flowing through the inlet 200 and egressing through the outlet 201 at a lowered temperature. The captured heated vapor can then be directed for recovery in a refrigeration circuit to reduce energy consumption and the load requirement on the refrigerant compressor. It is contemplated that all of the joints be braised in order to provide a tighter vacuum type assembly. The dual-phase fluid flows through the area depicted as 210 while the vacuum is positioned at 209. The latent heat in the fluid will migrate to the vacuum (the lower pressure) as in the plate type unit. FIG. 10 is a cross-sectional view of a shell and tube type FVC having many porous membrane units in interconnection with a manifold equipped for providing a central vacuum through vacuum conduit 207. FIG. 11 shows a different type of header 201 in relationship with the sintered metal or porous portion of the structure 208 having a vacuum contained therein at 209. FIG. 12 shows a different configuration of the header in a cross-sectional view of the same. FIG. 13 demonstrates a shell and tube type porous membrane with the fluid flowing in passage 210 at a position juxtaposed to two axially located porous membrane elements 208 having a vacuum area at 209. FIG. 14 is a cross-sectional view of this embodiment.

Figure 15:
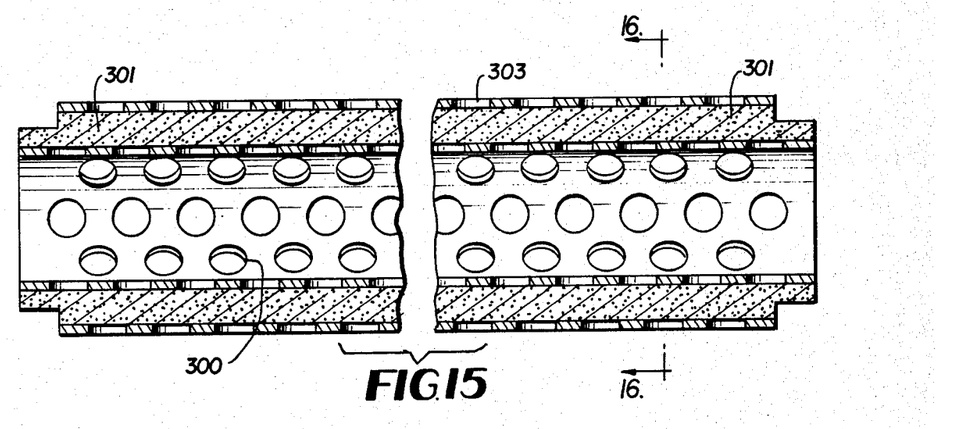
FIG. 15 shows use of a porous plastic, porous paper etc. in a rigid or semi-rigid membrane having an exterior rigid wall for reinforcement.
Figure 16:
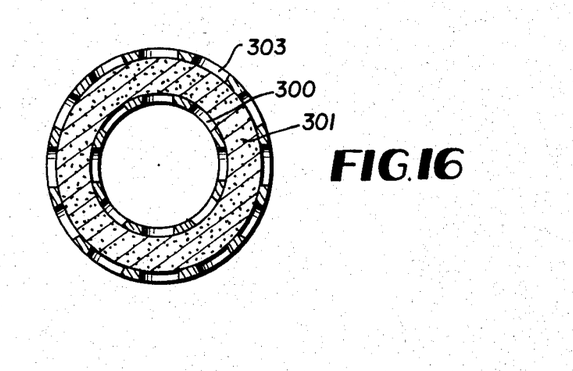
FIG. 16 shows a cross-sectional view of the membrane of FIG. 15.

FIG. 15 illustrates the use of a soft semi-rigid membrane material such as a porous plastic, porous paper or plastic impregnated paper in a FVC. The soft rigid membrane material may be encased in tubular stainless steel copper, bronze, tubing etc. which is perforated to permit the heat of vaporization to pass through but to restrain the refrigerant working fluid from doing the same. The inner and outer cylindrical tubular shells are for the purposes of preventing the soft semi-rigid porous membranes from collapsing under the inner- and outer- pressure differentials. A rigid wall 300 is utilized to support the semi-soft porous membrane. The porous membrane 301 may be constructed of a cloth or plastic or paper filter which has a porous micron size of between 5 and 100 microns. The support 300 is perforated in order that egressing heat of vaporization may be removed from the fluid of the system, i.e., FIGS. 1 through 5 via the instant cloth or paper porous material. An outer wall 303 supports the whole structure. FIG. 16 is a cross-sectional view of this type of conduit.

Figures 17, 18:
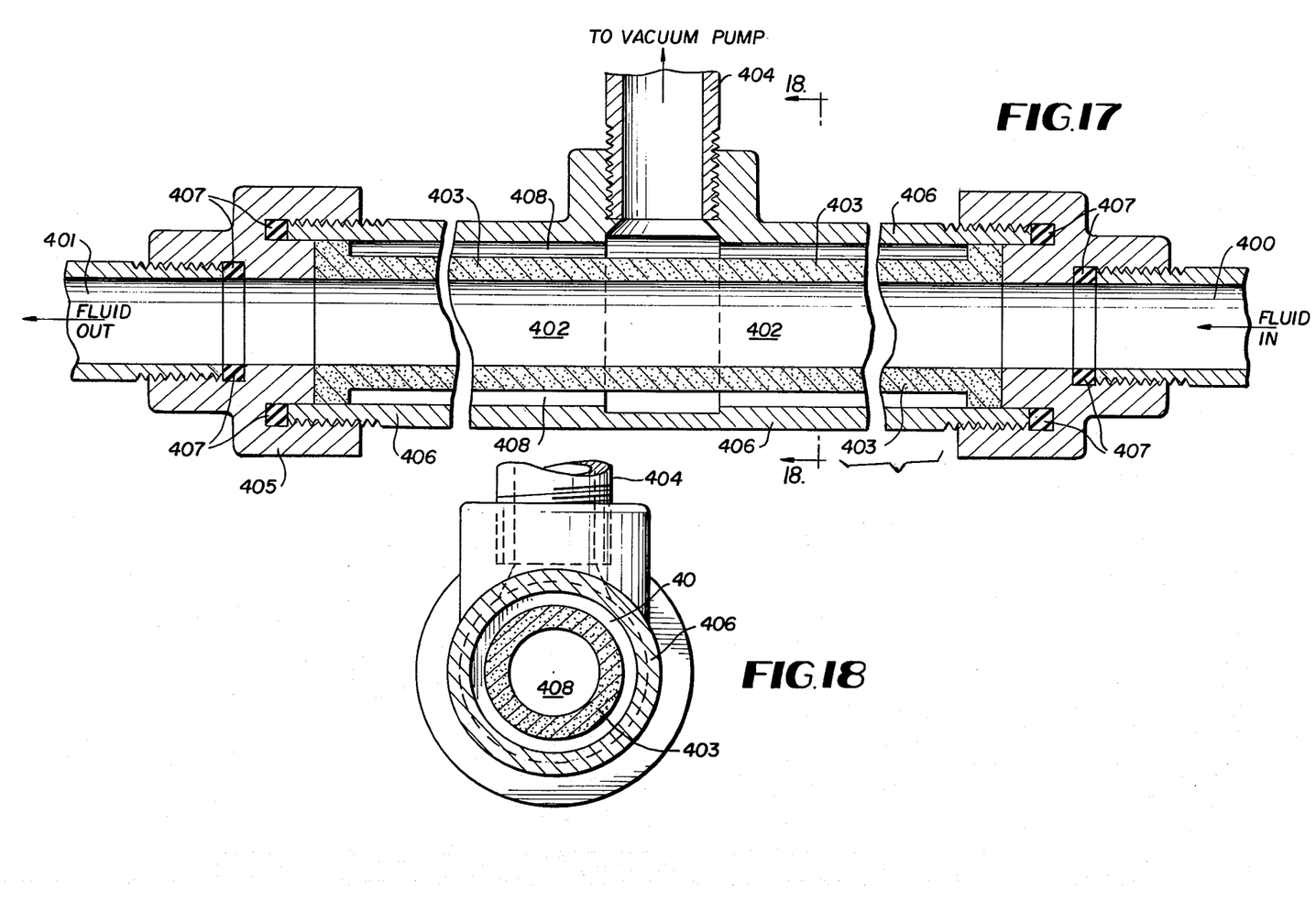
FIG. 17 shows a smaller shell and tube type fluid/vacuum chamber having internal flow design.
FIG. 18 is a cross-sectional view of FIG. 17.

FIG. 17 shows a small shell and tube type FVC wherein only one tube is situated within the shell. A fluid inlet 400 and fluid outlet 401 provide for respective ingress and egress of the subject dual-phase fluid. And of course the fluid coming into the fluid inlet will be at a higher temperature than the temperature egressing from the fluid outlet in light of the removal of the heat of vaporization via the FVC. The fluid may pass through conduit 402 while coming in contact with the sintered metal section 403, which in turn is in interconnection with a vacuum manifold section and a vacuum pump through conduit 404. The unit is provided with a header 405, a housing 406, and resilient seals 407 are provided in order to prevent the escape of any vapor or liquid at the juncture of the heading with the FVC. A vapor passageway 408 is provided between the rigid wall of the tube and the sintered metal wall of the FVC. A cross-section of the smaller shell and tube type FVC is shown in FIG. 18. This type of system is sometimes referred to as an internal flow type design FVC.

Figures 19, 20:
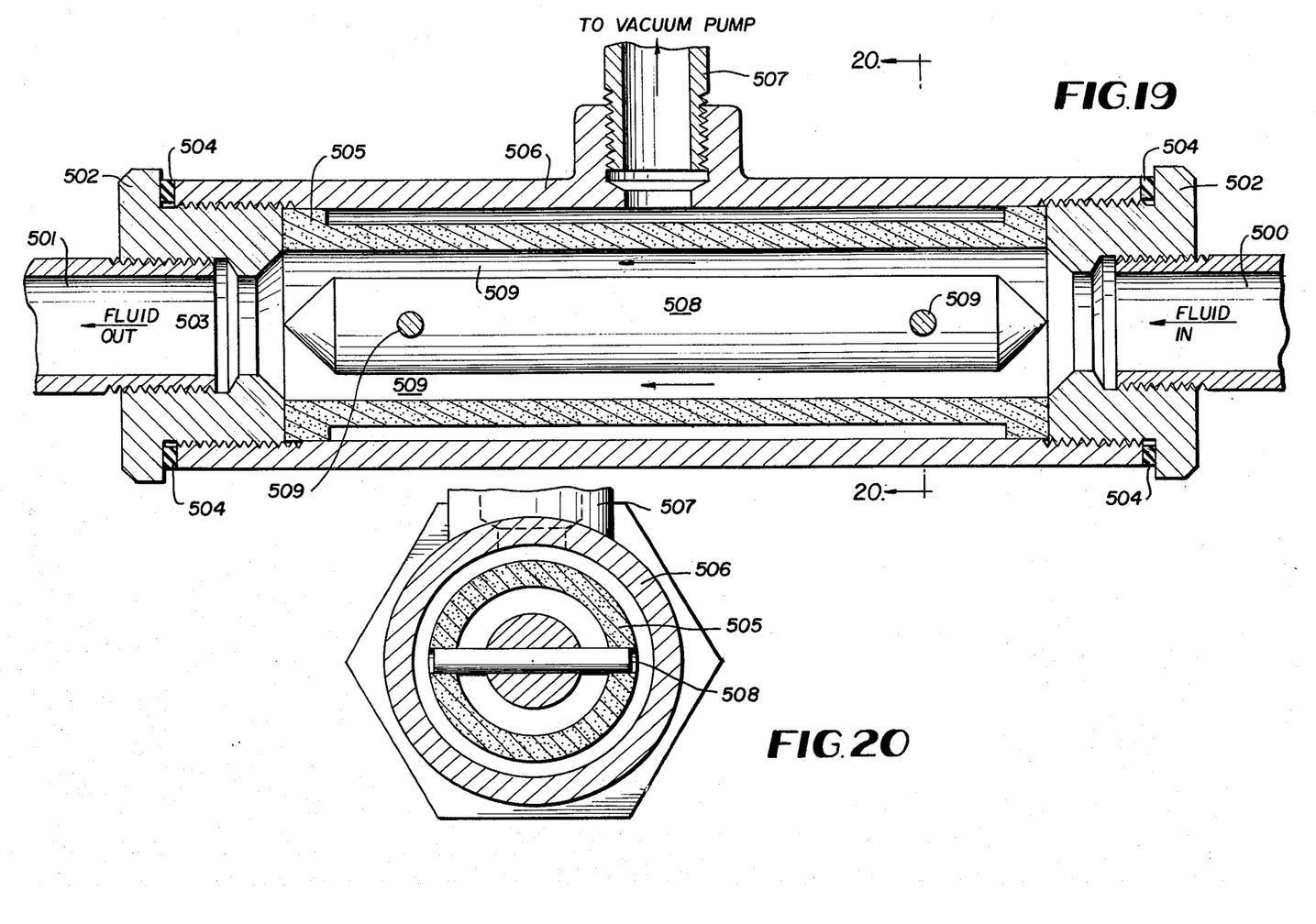
FIG. 19 shows a smaller shell and tube type fluid/vacuum chamber having external or limited internal fluid flow.
FIG. 20 is a cross-sectional view of the limited external fluid flow fluid vacuum chamber of FIG. 19.

An external flow type design of FVC is shown in FIGS. 19 and 20. A fluid inlet 500 and a fluid outlet 501 are provided at the extremities of the FVC. A fluid vacuum coupler fastener or header 502 is used in addition to retainer 503 and seals 504 in order to provide a leak-proof connection. The instant porous membrane or sintered metal 505 is coupled with a fluid vacuum coupling 506 which is in interconnection with a vacuum pump or a compressor via conduit 507. A fluid divider 508 comprising usually a solid bar of copper or stainless steel is utilized to force the fluid flow through a capillary juxtaposed to the sintered metal as depicted in 509. And it is for this reason this type of FVC is usually referred to as an external flow system. A retaining pin or pins 509 is provided to hold the solid bar 508 in place. FIG. 20 is a cross-sectional view of a pipe containing such an external flow type design for a FVC.

The above drawings were given in order to further exemplify the instant invention and were not made to act as a limitation upon the invention as now defined. The following is what I claim as my invention.

I claim as my invention:

1. In a cooling cycle wherein fluid is passed through a condenser, an expansion valve and an evaporator, at least one fluid vacuum chamber in the flow path between the evaporator and condenser to reduce the latent heat of vaporization of said stream passing between said evaporator and said condensor said chamber comprising:
    (a) an elongated housing means having an inlet for a vapor-liquid dual phase stream at one extreme thereof and an outlet for a vapor-liquid dual phase stream at the opposite end of said elongated housing for egression of a vapor-liquid dual phase stream having a reduced heat of vaporization compared with the heat of vaporization of said stream ingressing through said inlet;
    (b) a means for passage of said vapor-liquid dual phase stream in a pathway relatively parallel to the axes of said elongated housing means;
    (c) at least one tubular element within said elongated housing means having porous openings of from about 5 microns to about 100 microns being formed of sintered metal or ceramic for passage of at least a portion of the heat of vaporization through said pores of said sintered metal or ceramics to the interior of said tubular element, wherein said passage is achieved by maintaining the interior of said tubular member at a pressure lower than the pressure within said elongated housing means;
    (d) a vacuum attainment means in interconnection with the interior of said tubular member to provide said lower pressure within said tubular element; and,
    (e) a vacuum conduit means interconnecting said interior of said tubular element and said vacuum attainment means.

2. The cooling cycle of claim 1 wherein said vacuum is provided by means of a compressor and a four-way valve.

3. The cooling cycle of claim 1 wherein said vacuum is provided by a vacuum pump, fluid pump and dual shaft motor.

4. The cooling cycle of claim 1 wherein said vacuum attainment means comprises a vacuum manifold interconnecting a multiple of said tubular elements to provide a vacuum on said interior of said tubular elements.

5. A fluid/vacuum chamber for removal of the heat of vaporization of a vapor-liquid fluid which comprises:
   (a) an elongated housing means having an inlet for a vapor-liquid dual phase stream at one extreme thereof and an outlet for a vapor-liquid dual phase stream at the opposite end of said elongated housing for egression of a vapor-liquid dual phase stream having a reduced heat of vaporization compared with the heat of vaporization of said stream ingressing through said inlet;
   (b) a means for passage of said vapor-liquid dual phase stream in a pathway relatively parallel to the axes of said elongated housing means;
   (c) at least one tubular element within said elongated housing means having porous openings of from about 5 microns to about 100 microns being formed of sintered metal or ceramic for passage of at least a portion of the heat of vaporization through said pores of said sintered metal or ceramic to the interior of said tubular element, wherein said passage is achieved by maintaining the interior of said tubular member at a pressure lower than the pressure within said elongated housing means;
   (d) a vacuum attainment means in interconnection with the interior of said tubular member to provide said lower pressure within said tubular element; and,
   (e) a vacuum conduit means interconnecting said interior of said tubular element and said vacuum attainment means.

6. The fluid/vacuum chamber of claim 5 wherein the porous surface of said tubular element is constructed of sintered brass, sintered stainless steel, sintered nickel, or ceramic.

7. The fluid/vacuum chamber of claim 5 wherein said porous surface has a silica gel incorporated thereto.

8. The fluid/vacuum chamber of claim 5 wherein the vacuum attainment means is a compressor.

9. The fluid/vacuum chamber of claim 5 wherein the fluid attainment means is a vacuum pump.

10. The fluid/vacuum chamber of claim 5 wherein the vacuum conduit means comprises an elongated solid tubular structure.

11. The fluid/vacuum chamber of claim 5 wherein said chamber is constructed with a rectangular elongated housing means.

12. The fluid/vacuum chamber of claim 5 wherein said elongated housing means is in the shape of a square.

13. The fluid/vacuum chamber of claim 5 wherein said elongated housing means has a circular configuration.

14. The fluid/vacuum chamber of claim 5 wherein up to 250 tubular elements are disposed perpendicular to the flow axes of the elongated housing means.

15. The fluid/vacuum chamber of claim 5 wherein said tubular elements are constructed in a plate-type arrangement.

16. The fluid/vacuum chamber of claim 5 wherein said tubular elements are constructed in a shell and tube type arrangement having tubular elements positioned parallel to the axes of the fluid flow from said dual-phase inlet to said dual-phase outlet.

17. The fluid/vacuum chamber of claim 5 wherein said tubular element comprises a cloth or paper filter element having a sintered metal support sheath.

18. The fluid/vacuum chamber of claim 5 wherein said fluid flow from said dual-phase inlet to said dual-phase outlet is constricted to at least two channels in juxtaposition to at least two tubular elements possessing said porous surfaces, said channels being defined by said porous surface and a secure solid metal bar within said flow path of fluid in said fluid vacuum chamber.

19. In a heating cycle wherein fluid is passed through an evaporator, an expansion valve and a condenser, at least one fluid vacuum chamber in the flow path between the condenser and evaporator to reduce the latent heat of vaporization of said stream passing between said condenser and said evaporator, said chamber comprising:
   (a) an elongated housing means having an inlet for a vapor-liquid dual phase stream at one extreme thereof and an outlet for a vapor-liquid dual phase stream at the opposite end of said elongated housing for egression of a vapor-liquid dual phase stream having a reduced heat of vaporization compared with the heat of vaporization of said stream ingressing through said inlet;
   (b) a means for passage of said vapor-liquid dual phase stream in a pathway relatively parallel to the axes of said elongated housing means;
   (c) at least one tubular element within said elongated housing means having porous openings of from about 5 microns to about 100 microns being formed of sintered metal or ceramic for passage of at least a portion of the heat of vaporization through said pores of said sintered metal or ceramic to the interior of said tubular element, wherein said passage is achieved by maintaining the interior of said tubular member at a pressure lower than the pressure within said elongated housing means;
   (d) a vacuum attainment means in interconnection with the interior of said tubular member to provide said lower pressure within said tubular element; and,
   (e) a vacuum conduit means interconnecting said interior of said tubular element and said vacuum attainment means.

20. The heating cycle of claim 19 wherein said vacuum is provided by means of a compressor and a four-way valve.

21. The heating cycle of claim 19 wherein said vacuum is provided by a vacuum pump, fluid pump and dual shaft motor.

22. The heating cycle of claim 19 wherein said vacuum attainment means comprises a vacuum manifold interconnecting a multiple of said tubular elements to provide a vacuum on said interior of said tubular elements.

* * * * *